(12) United States Patent
Goldstein et al.

(10) Patent No.: US 6,378,075 B1
(45) Date of Patent: Apr. 23, 2002

(54) TRUSTED AGENT FOR ELECTRONIC COMMERCE

(75) Inventors: Theodore C. Goldstein, Palo Alto; Ronald G. Martinez, San Francisco; Paul Rubin, Milpitas, all of CA (US)

(73) Assignee: The Brodia Group, San Francisco, CA (US)

( * ) Notice: Subject to any disclaimer, the term of this patent is extended or adjusted under 35 U.S.C. 154(b) by 0 days.

(21) Appl. No.: 09/458,350

(22) Filed: Dec. 9, 1999

Related U.S. Application Data

(63) Continuation-in-part of application No. 08/834,027, filed on Apr. 11, 1997, now Pat. No. 6,119,229.
(60) Provisional application No. 60/111,988, filed on Dec. 12, 1998.

(51) Int. Cl.[7] .............................................. G06F 12/14
(52) U.S. Cl. ........................................ 713/200; 705/64
(58) Field of Search ................................ 713/200–202, 713/233; 705/26, 39, 41, 59, 64, 69, 76, 80

(56) References Cited

U.S. PATENT DOCUMENTS

| | | | | |
|---|---|---|---|---|
| 5,710,887 A | * | 1/1998 | Chelliah et al. | 705/26 |
| 5,745,886 A | * | 4/1998 | Rosen | 705/39 |
| 5,903,880 A | * | 5/1999 | Biffar | 705/39 |
| 5,960,411 A | | 9/1999 | Hartman et al. | 705/26 |
| 6,072,870 A | * | 6/2000 | Nguyen et al. | 380/24 |

FOREIGN PATENT DOCUMENTS

| | | |
|---|---|---|
| WO | WO 99/24891 | 5/1999 |
| WO | WO 99/24892 | 5/1999 |

* cited by examiner

*Primary Examiner*—James P. Trammell
*Assistant Examiner*—Pierre Elisca
(74) *Attorney, Agent, or Firm*—Michael A. Glenn; Kirk Wong

(57) ABSTRACT

A trusted agent server provides a networked application that assists a customer in managing their online commercial affairs. A user contacts the server using a network access device, such as a browser on a personal computer. The trusted agent client component augments the user's network access device to perform business transactions on behalf of the user. The user controls these transactions through the trusted agent server. A trusted agent service is a trusted agent client component application which operates in conjunction with the trusted agent server. The trusted agent service is an Internet-based mechanism that makes single-click buying available on any commercial Web site. The trusted agent also provides customers with access to personal and credit card information used during single-click transactions, smart receipts used for ongoing customer support, merchant and product preference settings, and direct response product offerings keyed to these preferences. Because this information is all stored on the trusted agent server, it is available to any device connected to the Internet. The trusted agent service is implemented by operating the trusted agent server.

22 Claims, 9 Drawing Sheets

1 Customer visits a Trusted Agent Service Provider running the Trust Agent Server, such as bank.com using a web browser

2 Customer selects an account name & password and fills in preference info & one or more bank card accounts and other instruments 2a LEDOs are populated into the Trust Agent Server database

3 Customer is prompted to bookmark the URL of their Trust Agent Services Provider as a button

FIG. 6

| User's Browser | Trusted Agent | Merchant & Trusted Agent Server |
|---|---|---|
| 1. User browses the web to a merchant web site | | |
| | | 2. Merchant conducts a session with the user |
| | | 3. Merchant downloads a page to end user |
| 4. User invokes the Trusted Agent service using a URL | | |
| | | 5. Trusted Agent Server download the Trusted Agent Program |
| | 6. Trusted Agent program inspects the Merchant's web page in the consumer's browser | |
| 7. User types in their Trusted Agent name and password | | |
| 8. User submits the web page to Trusted Agent server | | |
| | 9. Along with the name and password, the merchant web page is uploaded to the Trusted Agent server | |
| | | 10. Trusted Agent Server analyzes the page |
| | | 11. A new Trusted Agent Program is generated by Trusted Agent Server |
| | 12. The generated trusted agent program received by the client instruments the merchant web page | |
| 13. User sees a set of operations such as credit card selection or address book selection in their Trusted Agent. | | |
| 14. User selects the operation from the trusted agent page | | |
| | 15. Trusted agent fills out web page | |
| 16. User submits the merchant web page | | |
| | | 17. Merchant process merchant web page as usual |

FIG. 7

TRUSTED AGENT FOR ELECTRONIC COMMERCE

CROSS-REFERENCE TO RELATED APPLICATIONS

This application claims priority from Provisional Patent Application No. 60/111,988, filed on Dec. 12, 1998 and is also continuation-in-part of application Ser. No. 08/834,027, filed on Apr. 11, 1997 now U.S. Pat. No. 6,119,229.

FIELD OF THE INVENTION

The invention relates to electronic commerce. More particularly, the invention relates to a trusted agent for use in simplifying electronic commercial transactions.

BACKGROUND OF THE INVENTION

The volume of North American, customer world-wide-Web ("Web") based electronic commerce is enormous (estimated to be $5 billion in 1998). But this is still barely ½ percent of the $1 trillion dollar credit card transaction business. While thirty percent of North Americans are occasional Web users and ten percent are online daily, only twenty percent of Web users have purchased anything on the Web, and only a small portion of those customers purchase regularly.

First generation Web commerce systems are all based on the filling out of HTML forms. The first time a Web site is encountered, the end user must supply his name, address, phone-numbers, credit card numbers, and other personal information. This experience is analogous to being handed a clipboard and filling in an application every time you wish to purchase a quart of milk. Many customers are deterred by the bother involved in this process. Accordingly, a first requirement for customer friendly electronic commerce is:

Requirement 1: Do not make customers fill out a Web form for every new site.

Commerce Net/Nielsen have conducted annual studies where they have interviewed customers and businesses on their use and adoption of Web-based electronic commerce. These studies have repeatedly indicated that while failure to purchase has been attributed to numerous individual factors, these factors can be reduced to four root causes:

Lack of trust in credit card;

Fear of invasion of privacy by merchants;

Confusing Web page user interfaces encountered at point of purchase; and

Lack of interesting goods to buy.

These problems can be identified as shortcomings in state of the art electronic commerce systems. Solving these problems requires at least the provision of a system that addresses the following additional design requirements:

Requirement 2: Provide customers with trust;
Requirement 3: Provide customers with privacy;
Requirement 4: Provide customers with help navigating customer Web pages; and
Requirement 5: Provide customers with help finding the goods they want.

Previous Attempts at Bridging the Gap

Early attempts at addressing the problems discussed above via customer application technology, referred to generically as electronic wallets, have yet to be successful. Typically, these wallets provide technology focused customer-side applications that implement specific cryptographic protocols. These applications are not user friendly.

First Generation Wallets

CyberCash, DigiCash, IBM, and other companies have created purchasing applications that allow customers/merchants to conduct secure transactions. These applications have been distributed both on disk (floppies and CDROMs) and dynamically downloaded at time of customer purchase. Anecdotal evidence indicates that customers dislike installing software at time of customer purchase. The bother about the installation process, the fears of incorrect installation, and security problems deter shoppers. For the majority of customers, shopping is a pleasurable experience, while software installation is drudgery.

Requirement 6: Do not require users to install any application to get started.

Second Generation Wallets

Microsoft's Wallet (Microsoft Corporation of Redmond, Wash.) is built into the Internet Explorer browser. This wallet does assist in saving users from repeatedly typing in their credit card information. However, merchants have to use Microsoft's Site Server product to use the Microsoft wallet. Adoption of the Microsoft wallet by merchants is slow. Merchants prefer to continue to do business with the least common denominator. Even sites that are advertised to use the Microsoft Wallet by Microsoft do not seem to actually use it.

Requirement 7: Do not require merchants to switch merchant servers to get started.

Third Generation Wallets

Sun Microsystems of Mountain View, Calif. offers a Java Wallet strategy that is designed to overcome the foregoing problem. The Java Wallet provides a user friendly design, multiple payment mechanisms, automatic form fill out, and gives users incentives to install the application. The Java Wallet still requires an initial install. The success of this strategy is not yet known.

It would be advantageous to provide a customer-friendly electronic commerce system that meets the above identified requirements for electronic commerce.

SUMMARY OF THE INVENTION

The trusted agent server disclosed herein is a networked application that assists a customer in managing their online commercial affairs. Although the presently preferred embodiment of the trusted agent server is an electronic commerce application, the trusted agent has broad use in other business domains including, for example, finance, medicine, investment, entertainment, and education.

The trusted agent server can be thought of as a third party that holds and manages the user's business affairs, such as a credit card, a product warranty, an insurance card, or any business contract. User's contact the server by way of a network access device, such as a browser on a personal computer, a browser on a network computer, a browser on a cell phone, or using a voice response unit on a telephone.

The trusted agent client component is a small customer program that augments the user's network access device to perform business transactions on behalf of the user. The user controls these transactions through the trusted agent server.

The trusted agent service is the trusted agent client component application which operates in conjunction with the trusted agent server. The trusted agent service in its first embodiment is an Internet-based mechanism that makes single-click buying available on any commercial Web site. This mechanism brings the speed and simplicity of credit card use in the real world to its users on the Internet. The secure nature, and bank and credit card company branding, provided by this mechanism projects the trust association necessary at the point-of-sale to address customer fears about security. This mechanism is a browser-based service that requires no download or installation, and may always be made available to the customer free of charge.

The trusted agent also provides customers with access to personal and credit card information used during single-click transactions, smart receipts used for ongoing customer support, merchant and product preference settings, and direct response product offerings keyed to these preferences. Because this information is all stored on the trusted agent server (similar to popular Web portal personal preferences), it is available on any device connected to the Internet, from desktop to laptop, even to PDA.

The trusted agent service is implemented by accessing the trusted agent server. Typically, trusted agent servers are operated by banks, government agencies, credit card companies, and other contractually reliable trusted agent service providers.

The trusted agent server communicates with other commerce servers. Some of these servers are designed to work closely with the trusted agent server. In the preferred embodiment of the invention, two such commerce servers are the direct response server and relationship marketing servers. Merchants and banks use these servers to communicate to customers who have accounts on a trusted agent service. These products enable such merchants and banks to conduct ongoing business relationships with customers by sending and making use of information stored online in the customer's trusted agent.

BRIEF DESCRIPTION OF THE DRAWINGS

FIG. 6 is a block schematic diagram that depicts the customer sign up process according to the invention;

FIG. 7 is a flow diagram that depicts the use of the trusted agent by a customer during a commercial transaction with a merchant according to the invention;

DETAILED DESCRIPTION OF THE PREFERRED EMBODIMENT

Figure 1:
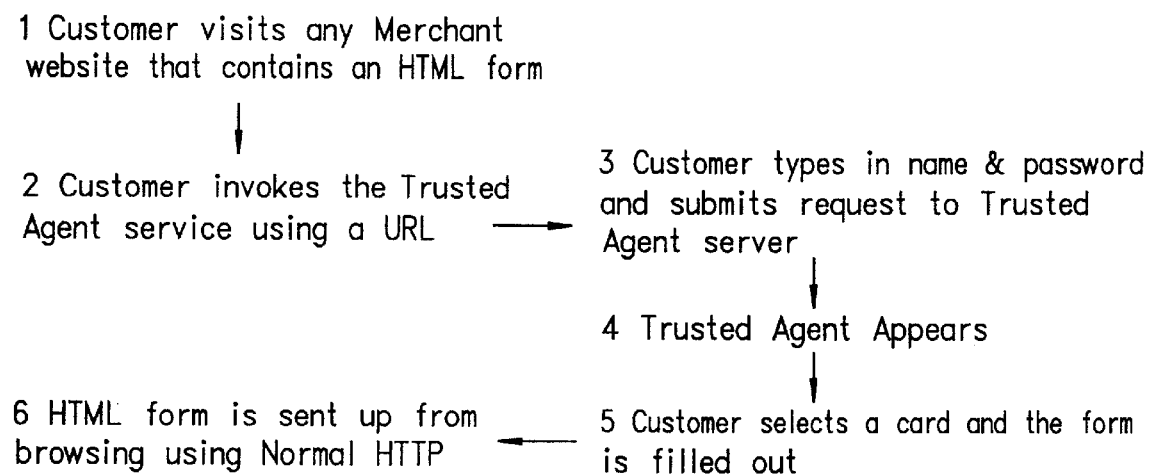
FIG. 1 is a flow diagram showing a trusted agent process according to the invention.

The trusted agent server disclosed herein is a networked application that assists a customer in managing their online commercial affairs. Although the presently preferred embodiment of the trusted agent server is an electronic commerce application, the trusted agent has broad use in other business domains including, for example, finance, medicine, investment, entertainment, and education.

The trusted agent server can be thought of as a third party that holds and manages the user's business affairs, such as a credit card, a product warranty, an insurance card, or any business contract. User's contact the server by way of a network access device, such as a browser on a personal computer, a browser on a network computer, a browser on a cell phone, or using a voice response unit on a telephone.

The trusted agent client component is a small customer program that augments the user's network access device to perform business transactions on behalf of the user. The user controls these transactions through the trusted agent server.

The Trusted Agent Service

The trusted agent service is the trusted agent client component application which operates in conjunction with the trusted agent server. The trusted agent service in its first embodiment is an Internet-based mechanism that makes single-click buying available on any commercial Web site. This mechanism brings the speed and simplicity of credit card use in the real world to its users on the Internet. The secure nature, and bank and credit card company branding, provided by this mechanism projects the trust association necessary at the point-of-sale to address customer fears about security. This mechanism is a browser-based service that requires no download or installation, and may always be made available to the customer free of charge.

The trusted agent also provides customers with access to personal and credit card information used during single-click transactions, smart receipts used for ongoing customer support, merchant and product preference settings, and direct response product offerings keyed to these preferences. In the preferred embodiment, the following categories are used:

Antiques and Collectibles
Apparel and Accessories
Around the House
Automotive
Books
Computer Hardware
Computer Software
Consumer Electronics
Entertainment
Financial and Business Services
Flowers and Cards
Food and Drink
Gardening
Gifts
Health, Fitness and Beauty
Miscellaneous
Movies and Videos
Music
Office
Pets
Sporting Goods
Toys, Games and Hobbies
Travel.

Because this information is all stored on the trusted agent server (similar to popular Web portal personal preferences), it is available on any device connected to the Internet, from desktop to laptop, even to PDA.

The trusted agent service is implemented by accessing the trusted agent server. Typically, trusted agent servers are operated by banks, government agencies, credit card companies, and other contractually reliable trusted agent service providers.

Other Commerce Servers

The trusted agent server communicates with other commerce servers. Some of these servers are designed to work closely with the trusted agent server. In the preferred embodiment of the invention, two such commerce servers are the direct response server and relationship marketing servers. Merchants and banks use these servers to communicate to customers who have accounts on a trusted agent service. These products enable such merchants and banks to conduct ongoing business relationships with customers by sending and making use of information stored online in the customer's trusted agent.

The direct response server enables the creation, delivery, and single-click redemption of direct response offers from anywhere on the Internet. These offers can be delivered to trusted agents according to customer preferences, or found in a banner-like format on Web sites. The direct response server can deliver online any one of at least three classic forms of traditional direct response:

First, they can process a direct order by concluding a transaction for the product they represent without requiring a jump to any other site.

Second, they can generate a lead by transmitting a request to a merchant for additional information.

Third, they can generate store traffic, either through a link to redemption at an online commerce site, or by being printed on paper and taken for redemption to an actual retailer location.

The relationship marketing server uses smart receipts as the basis for after-market customer care. When a customer buys a product, the merchant's relationship marketing server generates a unique digital object in the form of a smart receipt which contains all of the information needed for customer care. The relationship marketing server sends this information to the customer's trusted agent. The customer can open his trusted agent using a URL, click on the smart receipt, and be presented with a number of services, such as automatically routed requests for customer service or return authorizations, 800 number listings to call for help, order status tracking (for example, offered in eventual partnership with such shipping companies as Federal Express or UPS), and pre-formatted and routed requests for related product offers.

Other commerce servers enable point-based loyalty programs and club cards for discounted purchases and volume purchase rewards.

The trusted agent process is depicted in FIG. 1. In a typical transaction, a customer visits any merchant Web site that contains an HTML form (1). The customer invokes a trusted agent service provider service using a specific URL that links the customer to the trusted agent service provider's server (2). The customer types in his name and password, and the customer request is submitted to the trusted agent server (3). The trusted agent appears (4). The customer selects a card and the form is automatically filled out for the customer by the trusted agent (5). The HTML form is then sent to the merchant from the customer's browser using the standard HTTP transport protocol (6).

While the invention is described herein in connection with the HTML and HTTP protocols, it will be appreciated by those skilled in the art that other protocols may be used to implement the invention.

Entities and their Communication Techniques

Figure 2:
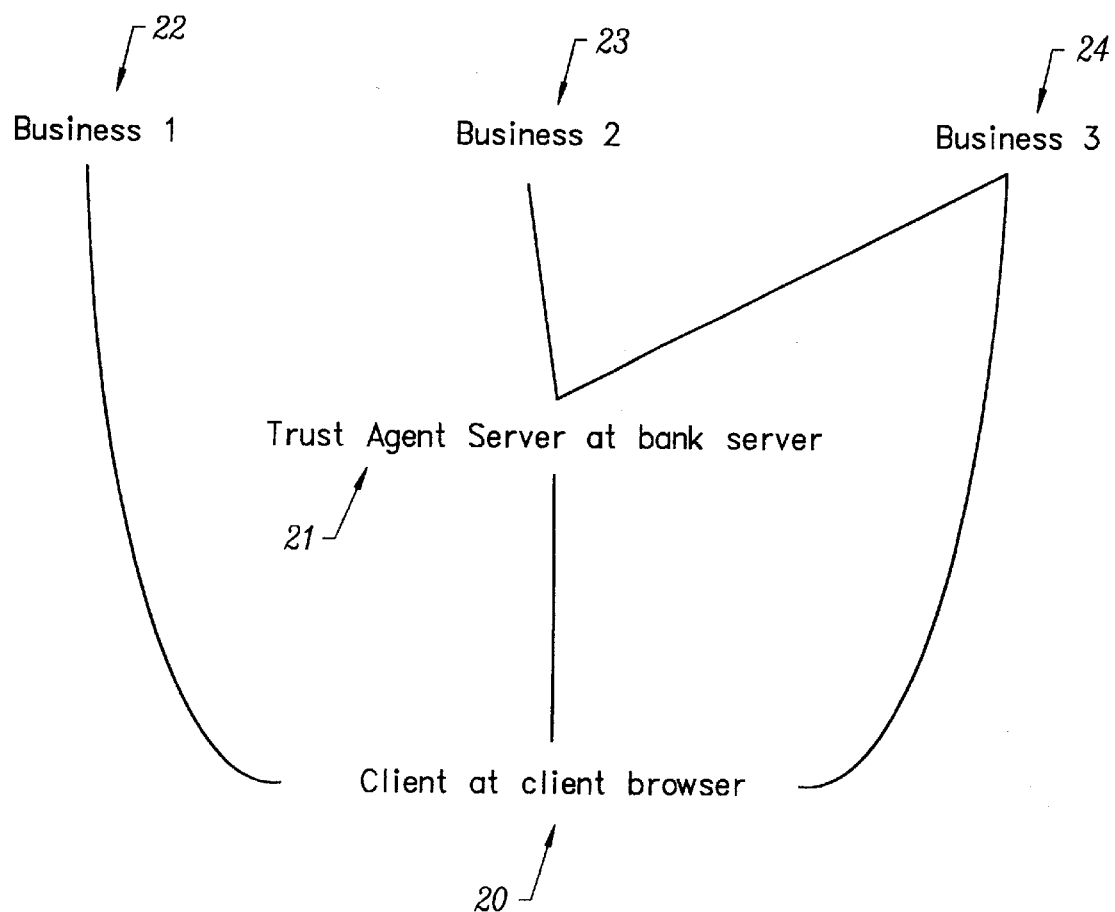
FIG. 2 is a block schematic diagram showing a customer in communication with both a trust agent server and various business according to the invention.

FIG. 2 is a block schematic diagram that depicts the trusted agent service provider customer 20 in communication with both the trusted agent server 21 and various businesses 22–24. The trusted agent server performs certain actions on behalf of the customer. These actions may be done using two techniques (discussed below), referred to herein as the indirect technique and the direct technique. This communication may be based on known Internet protocols, such as the World-Wide-Web consortium's HTTP protocol. However, those skilled in the art will appreciate that alternative protocols are possible.

There are three types of business that may be associated with the presently preferred embodiment of the invention:

Businesses of type 1 are legacy businesses that are not yet enabled with the more modern direct techniques. Therefore, type 1 businesses use the indirect technique exclusively.

Businesses of type 2 only use the direct techniques.

Businesses of type 3 can use both the direct and indirect techniques.

The Indirect Technique

Figure 3:
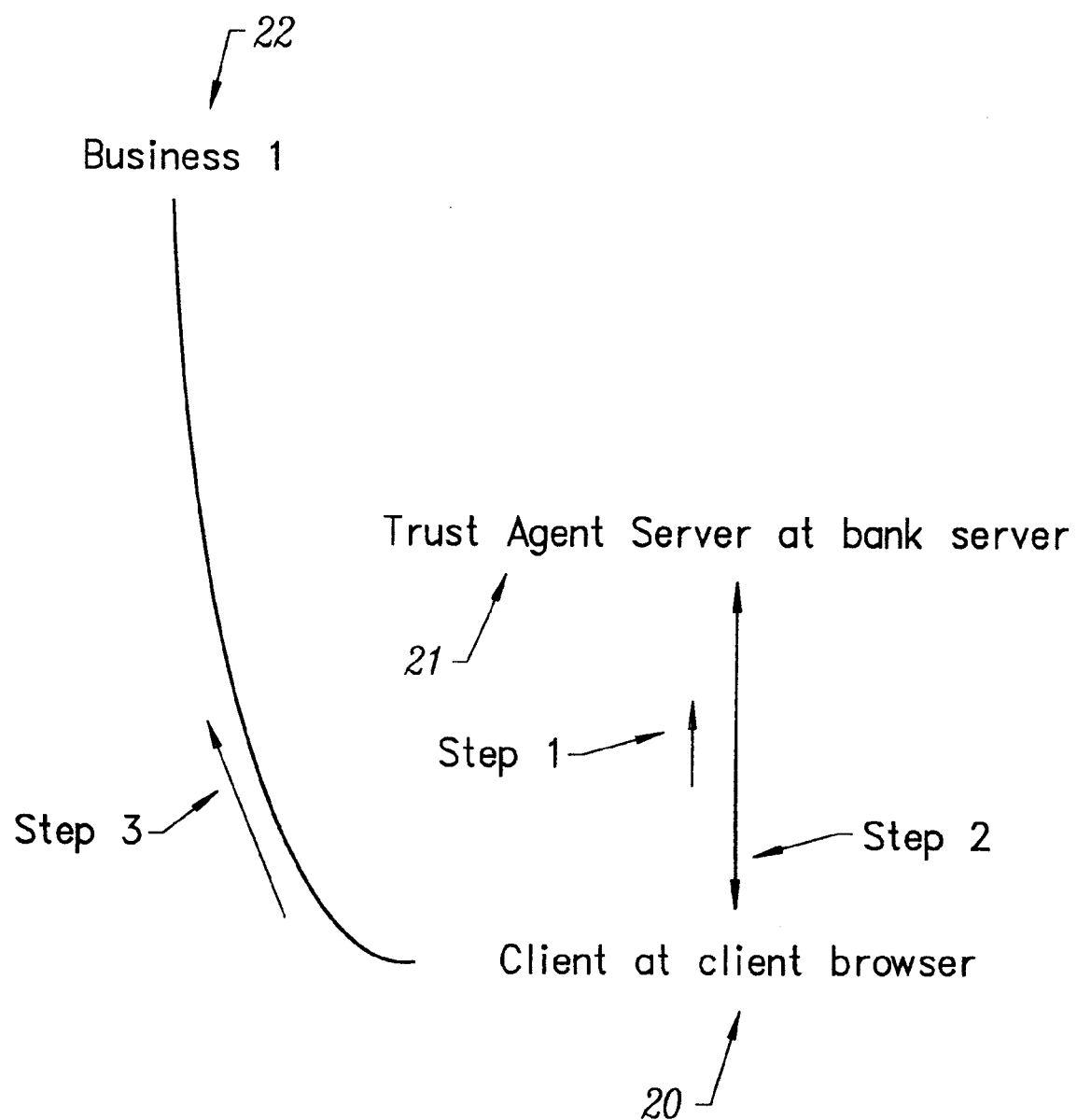
FIG. 3 is a block schematic diagram that depicts the indirect technique according to the invention.

The indirect technique communicates command operations from the trusted agent server first to the user's browser and then to a business. FIG. 3 is a block schematic diagram that depicts the indirect technique. The process flow applied by the indirect technique is as follows:

The customer (customer) invokes the trusted agent service.

Interaction between the customer and the trusted agent server.

The customer submits Web page to business.

The Direct Technique

Figure 4:
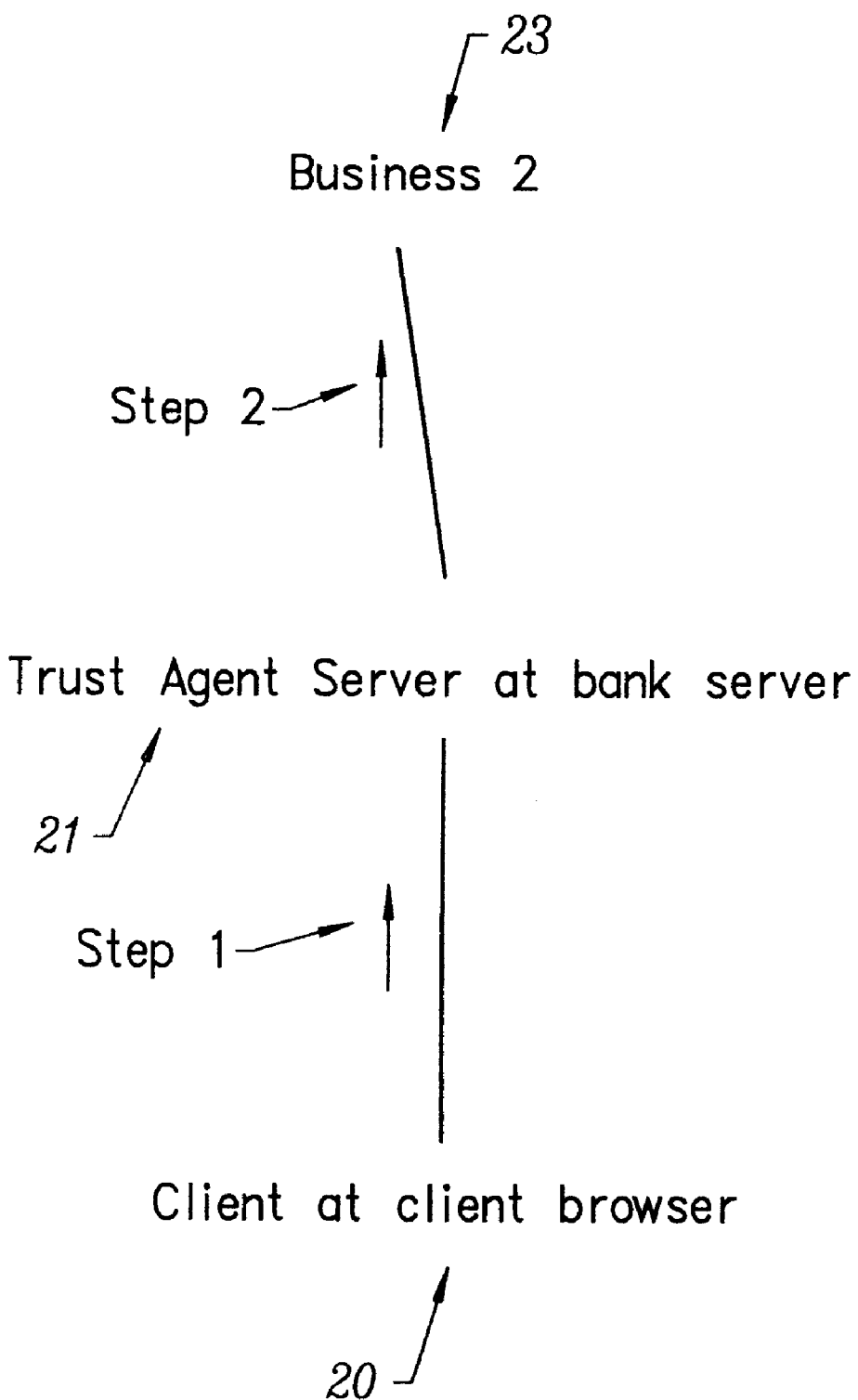
FIG. 4 is a block schematic diagram that depicts the direct techniques according to the invention.

The direct technique communicates operations directly from the trusted agent server to the business. FIG. 4 is a block schematic diagram that depicts the direct technique. In the preferred embodiment of the invention, the trusted agent server communicates to the business server either using HTML or using the technology of Brodia.com of San Francisco, Calif. referred to as the Limited Edition Digital Object (LEDO) system as described in U.S. patent application Ser. No. 08/834,027, owned by the Applicant. Those skilled in the art will appreciate that other protocols are possible.

Business Instruments and their Embodiments

The customer understands that what they are manipulating is a familiar business instrument such as a credit card, a receipt, a coupon, a warranty, a contractual offer, a medical insurance card, or other well known commercial construct. It is simple to use a credit card number to charge goods and services to a credit card account without using the actual plastic card provided by the bank. The following definitions are applied to the different embodiments of these business instruments:

Business Document: the entity as it is embodied on paper or plastic.

Business Affair: the entity embodied in legal and business terms.

Business Object: the entity embodied in a computer.

Business Instrument: the entity overall.

Each business instrument can be represented in several ways. In the preferred embodiment of the invention, a business object is stored as a LEDO. Those skilled in the art will appreciate that other implementations are possible, e.g. the business affair may be stored as a record in a database. A LEDO is a network digital object that has ownership that can be verified over a network. LEDOs provide efficient techniques to implement many of the legal and business issues of the instrument's business affairs. However, other, less efficient techniques may be applied to manage the instrument's business affairs.

Figure 5:
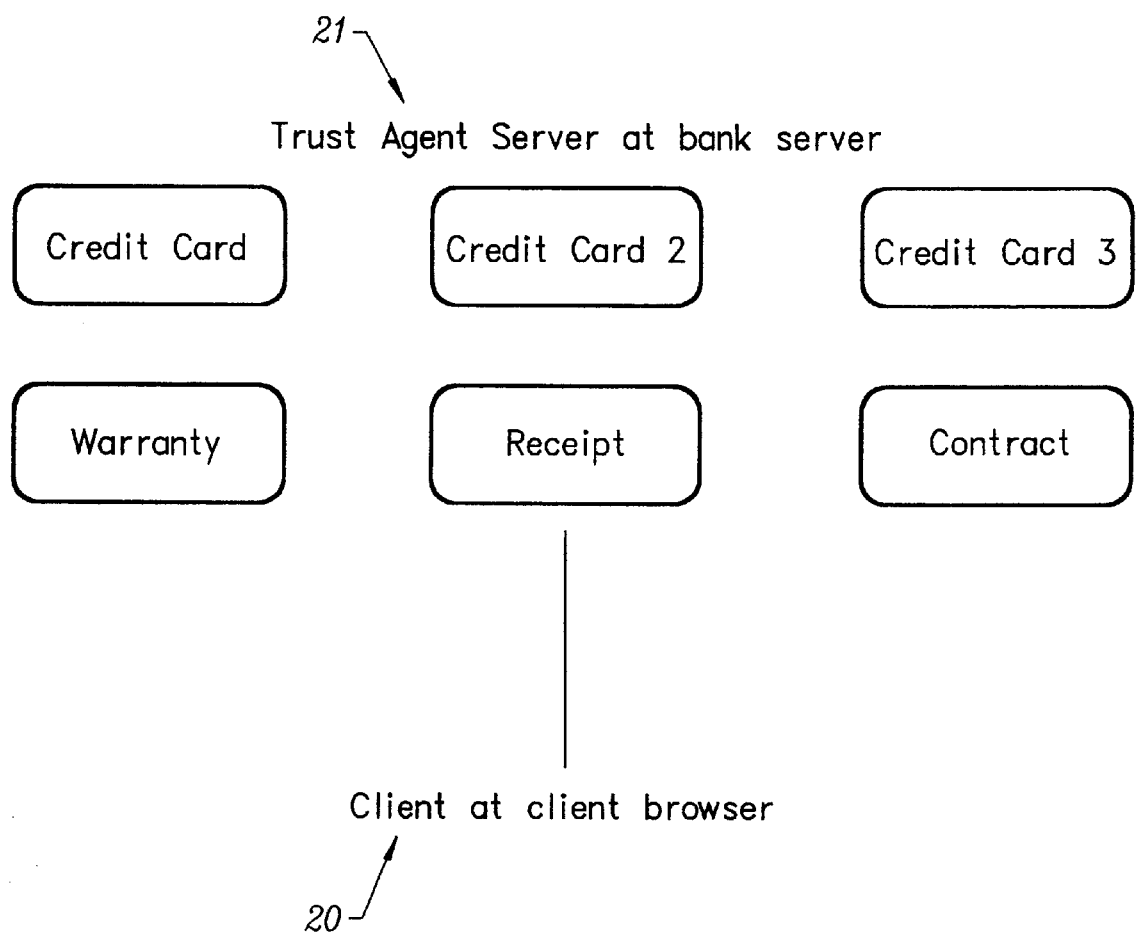
FIG. 5 is a block schematic diagram that depicts the trusted agent storing business objects on behalf of the customer according to the invention.

In the preferred embodiment of the invention, the business affairs are represented as LEDOs that are stored at the trusted agent server. FIG. 5 is a block schematic diagram that depicts the trusted agent storing business objects on behalf of the customer.

Customer Creation of the Trusted Agent Service

Customers sign up for the trusted agent service by visiting a trusted agent service provider Web site. FIG. 6 is a block schematic diagram that depicts the customer sign up process. The customer first visits a trusted agent service provider that is running the Trust Agent Server, for example a bank, using the customer's Web browser (1). The customer selects an account name and password and fills in preference information, as well as one or more bank card accounts, and other instruments (2). In the presently preferred embodiment of the invention, LEDOs are populated into the trust agent server database (2a). The customer is then prompted to bookmark the URL of their trust account service provider as a browser button (3).

Customer Use of the Trusted Agent, Indirect Technique

As described earlier, a customer can use their trusted agent service on any merchant Web site that is HTML compliant. The process requires an exchange between the customer browser, the merchant's Web server, and the trusted agent's Web server. FIG. 7 is a flow diagram that depicts the use of the trusted agent by a customer during a commercial transaction with a merchant.

The following describes the flow found in FIG. (7).

To use the trusted agent, the customer first uses an HTML-browser application such as Netscape's Navigator or Microsoft's Internet Explorer until he finds a merchant Web site that provides goods or services of intrest to him(1).

The merchant server begins a shopping session with the customer's HTML browser application (2). Pursuant to the session, the merchant's server downloads a page to the browser(3). At some point during the order taking process, the merchant transmits the page includes an HTML form that requests various information form the customer as part of an on-line commercial transaction. The trusted agent either automatically detects the form or the user manually invokes the form (4). The trusted agent server sends the trusted agent client component to the customer's browser embedded as either JavaScript applet, a Java applet or an Active-X control. The user can also download the trusted agent using the ftp, the http protocol or another transfer protocol (5). The trusted agent then accesses the merchant's web page using an application programming interface called the HTML DOM (Document Object Model) defined by the World Wide Web consortium. (6)

The trusted agent client component then authenticates the user using a name and password, a cookie or another authentication mechanism including possibly no authentication mechanism (7).

The trusted agent client component then analyzes key information about the merchant's web page such as URL, the names of the fields of the forms, and possibly even the text of the merchant's order form web page itself. Key information may be transmitted to the trusted agent server (8–9).

The trusted agent then analyzes the key information according to the following means(10): In the preferred embodiment, the server matches the URL information with a database of known merchant forms. It then selects the correct site drivers for that merchant web site. However those skilled in the art will know that it is possible for the trusted agent application server to either download just the components that is needed for this merchant web page. In the preferred embodiment the trusted agent sever selects the appropriate site driver components from a database of pre-created site drivers. Those skilled in the art will know that is possible to dynamically generate site drivers using the key information described above.

The trusted agent server then sends the site driver component to the trusted agent client application using the response message of the HTTP protocol (11).

The trusted agent client component receives the site driver component and prepares it for execution. The Trusted agent client then waits for the user. (12)

The customer then select a credit card, and a billing address using a user interface provided by the trusted agent client component (13). When the user selects the fill button (14) triggers the "fill" button, signals the trusted agent to execute the site driver with the selected credit card and billing address. (15).

The web page containing the merchant's HTML form is now complete and the user can submit the merchant's web page to the merchant's server using the normal HTTP protocol (16).

The trusted agent then monitors the merchant's web page. If subsequent pages contain forms, then the trusted agent then may invoke additional site drivers to fill in those pages.

Creating a Trusted Agent

The trusted agent is a small program that is written in a portable language, such as JavaScript, Java, C, C++, Visual Basic, Dynamic HTML program, or any other similar language. These programs are trusted because they are digitally signed by an authority that the end user trusts.

Figure 8:
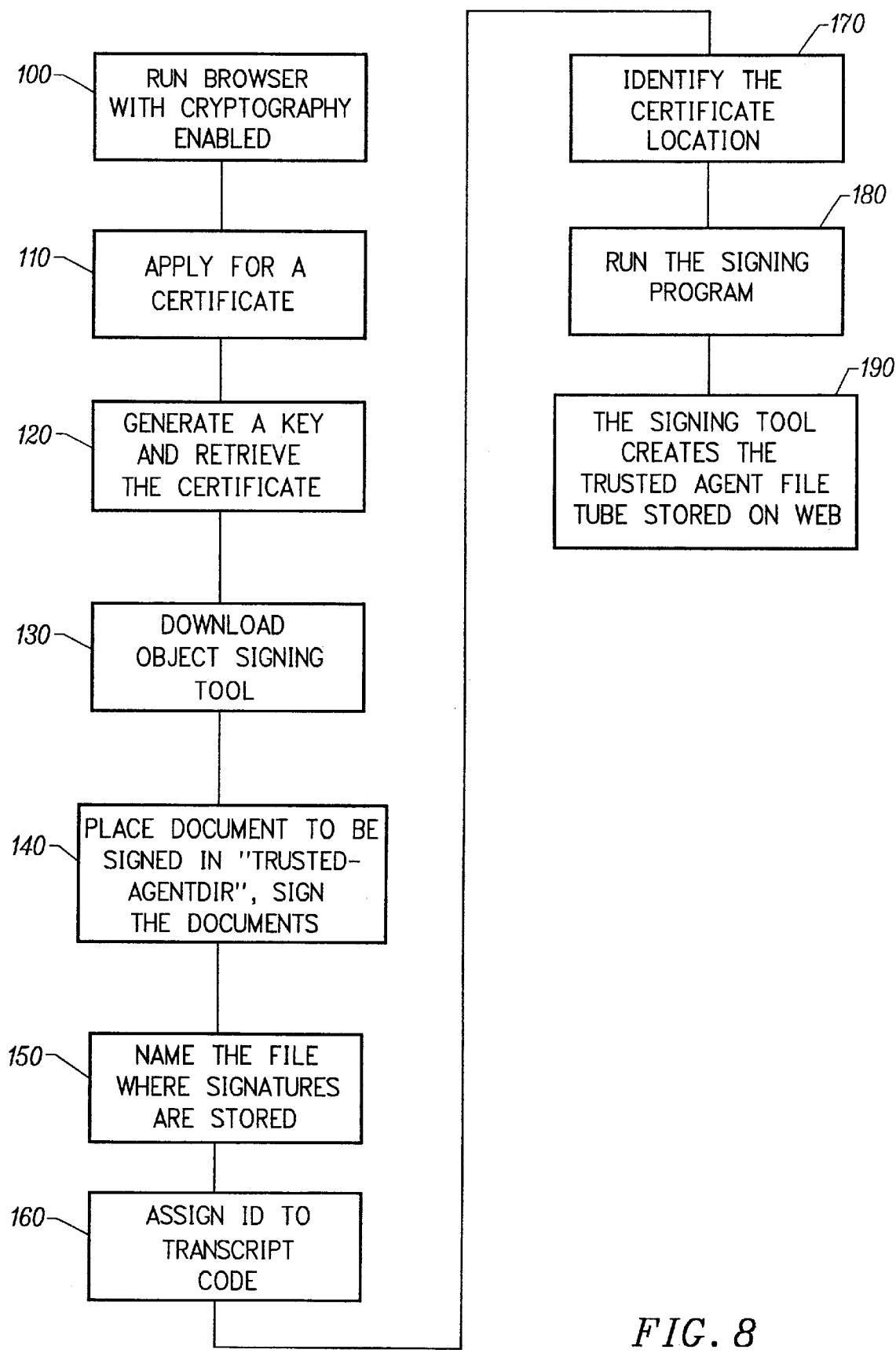
FIG. 8 is a flow diagram showing the creation of a trusted agent according to the invention.

The following discussion explains the presently preferred method of creating a trusted agent using JavaScript in the popular Netscape Navigator browser application (see FIG. 8). Those skilled in the art will appreciate that substantially similar forms can be implemented using Microsoft's Internet Explorer or any other browser.

To create and run signed JavaScript under Netscape Navigator, the developer must have be in possession of the private key and a certificate issued to an authority that the customer is willing to trust, such as Verisign (verisign.com).

Run a Navigator 4.05 or higher browser with 128-bit cryptography enabled (100). The browser may be downloaded from www.netscape.com by filling in a form with the user name and address and stating that the user is a U.S. national (U.S. government export controls apply to this level of cryptography). The standard export-approved browser has only 40 bit bulk encryption and 512 bit RSA, accordingly such certificate provides much less security. The actual level of cryptography obtained is a matter of choice.

Apply for a class 2 or 3 code signing certificate by using the above-mentioned browser to visit http://digitalid.verisign.com, clicking on "Developers," and following the instructions for getting a Netscape object-signing certificate (110). Class 2 certificates are for individuals, cost $20.00, and take a few minutes to obtain. Class 3 certificates are for companies, cost $400.00, and take longer (it is necessary to fax the company's incorporation papers and other documents to Verisign). It is necessary to provide personal information similar to a credit card application (e.g. social security number, current and previous addresses) to obtain a class 2 certificate. Getting the class 2 certificate involves obtaining a hexadecimal access code by email and pasting it back into Verisign's Web page. Instructions are provided on the page provided by Verisign.

Follow the instructions for generating a key in the browser and retrieving the certificate (120). The browser creates a key pair and uploads the public component to Verisign through a secure socket layer (SSL) channel. Verisign signs the public key and returns the certificate, and Navigator stores the key components and certificates in the \Program Files\Netscape\Users directory. As a result, there is a secret key on the Windows 95 (or Macintosh) hard disk. The certificate has an identifying string, such as "Theodore C Goldstein's Verisign Trust network ID," which is used by the signing tool (and other programs) to locate the certificate after Navigator installs the certificate in its database (along with whatever other certificates it has). Note this string is independent of the user name, which appears in the signed portion of the certificate and cannot be changed. Similarly, Navigator prompts the user for a password to access the secret key once it is in the database.

Download Netscape's object signing tool (130) from http://developer.netscape.com/software/signedobj/jarpack.html#signtool1.1 and install the tool. This program has a Windows 95-friendly interface, which means it can be run from a command line in a DOS box as if it were a Unix program.

Put the html files and JavaScript files that are to be signed in a directory (140), which may be called, for example, "TrustedAgentDir." Next, run the signing tool. The signing tool searches the TrustedAgentDir directory for JavaScript components. It signs each piece separately and stores the signatures in a jar file, which is similar to a zip file.

Select the name of the jar file where the signatures are stored, e.g. "TrustedAgent.jar". Every file containing JavaScript that must be signed must have a SCRIPT tag with the ARCHIVE attribute specifying the name of the jar file, e.g.:
<SCRIPT ARCHIVE="TrustedAgent.jar" ID="a">
[JavaScript code]
</SCRIPT>

More information on this step of the process is available at:
http://developer.netscape.com/docs/manuals/communicator/jsguide4/sec.htm Every piece of JavaScript code must have a unique ID attribute (160). The ID is a label that the browser uses to find the signature for that particular piece of code. For the above piece of code, the ID is "a." Somewhere further down in the file, there a button may be provided that runs other code when the button is clicked. That other code must also have its own signature. Accordingly, the other code needs its own unique ID tag:
<INPUT TYPE="button" NAME="check" VALUE="Click and Buy"
onClick="JavaScript:updateOpenero( )" ID="b">

Here, the tag "b" is assigned to the (small) piece of code "updateOpener( )" that is run when the button is clicked. Each piece of code must be signed because one is not allowed to run signed code from unsigned code.

Find the certificate location (170) by using Windows Explorer's "find file" command to locate a file called "cert7.db". This file should be in a directory, such as c:\programfiles\netscape\users\tedg. It is necessary to supply this directory name to the signing tool in the next step.

Use a command to run the signing program (180), such as:
signtool-d "C:\programfiles\netscape\users\tedg"
-k "Theodore C Goldstein's Verisign Trust Network ID"
-J TrustedAgentDir where the above command line arguments are all on one line. This command may be saved in a bat file, if it is necessary to run it often. The -J argument indicates the name of a directory that contains JavaScript code. The -d argument indicates where the private key and certificate are located. The user is prompted for the pass phrase as part of this operation.

The signing tool creates an TrustedAgent.jar file (190) which must be stored on the Web server along with the user scripts.

Alternative Embodiment of the Invention

Figure 9:
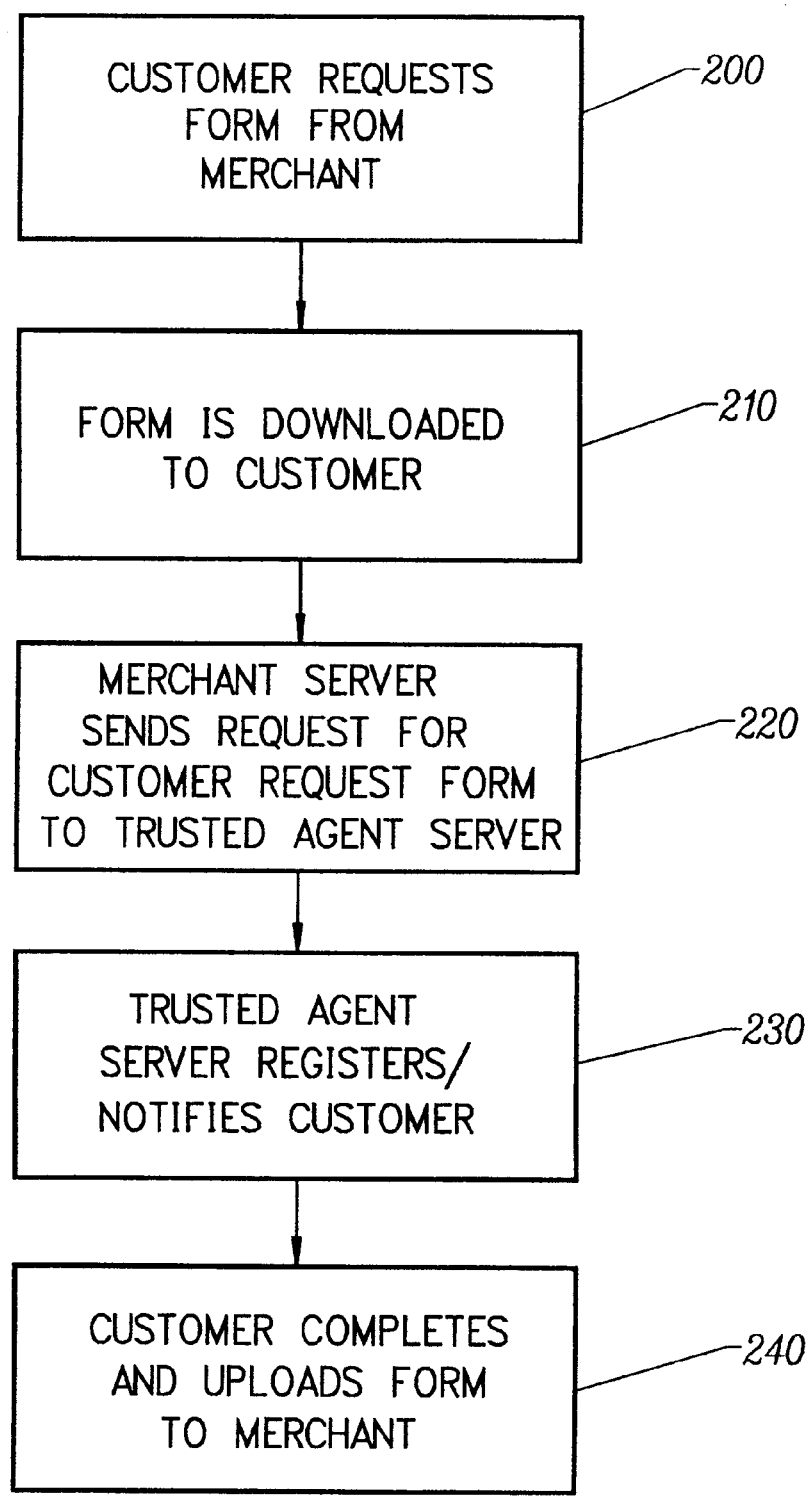
FIG. 9 is a flow diagram showing merchant initiated user trusted service registration according to the invention.

The embodiment of the invention provides merchant initiated user trusted service registration (see FIG. 9).

The customer requests a form from merchant Web site (200).

The form is downloaded from merchant Web site to the customer (210). The form includes a button that the customer can click to request registration with a trusted agent service.

If the customer actuates the button, the merchant server sends a request for customer registration to the trusted agent server (220).

The trusted agent server registers and notifies the customer (230).

The customer completes the form and uploads it to the merchant (240).

Although the invention is described herein with reference to certain preferred embodiments thereof, one skilled in the art will readily derive other embodiments and applications without departing from the spirit and scope of the invention. Accordingly, the invention should only be limited to the Claims included below.

What is claimed is:

1. An apparatus for assisting a customer in managing their online commercial affairs, comprising:
a trusted agent server that holds and manages said customer's business affairs;
a network access device by which said customer contacts said trusted agent server, said network access device including a trusted agent client that augments said network access device to perform commercial transactions with third parties on behalf of said customer;
wherein said customer controls said commercial transactions with said third parties through said trusted agent server;
wherein said trusted agent server communicates with at least one commerce server; and
wherein said commerce server comprises:
a direct response server for the creation, delivery, and redemption of direct response offers from anywhere on the Internet; and
wherein said offers can optionally be either delivered to trusted agents according to customer preferences, or found in a banner-like or other formats on Web sites.

2. The apparatus of claim 1, wherein said network access device is a browser; and
wherein said trusted agent server is invoked by selecting a corresponding network address with said browser.

3. The apparatus of claim 1, said trusted agent server further comprising:
a memory for storing customer related information including any of personal and credit card information, smart receipts used for ongoing customer support, merchant and product preferences, and direct response product offerings keyed to said product preferences.

4. The apparatus of claim 1, wherein said direct response server can deliver online a direct response comprising any of:
   a direct order by concluding a transaction for a product they represent without requiring a jump to any other site;
   a lead by transmitting a request to a merchant for additional information; and
   store traffic, either through a link to redemption at an online commerce site, or by printing said response on paper for redemption at a retailer location.

5. The apparatus of claim 1, wherein said commerce server comprises:
   a relationship marketing server which uses a smart receipt as the basis for after-market customer care.

6. The apparatus of claim 5, wherein said smart receipt is generated by said relationship marketing server when a customer buys a product as a unique digital object which contains all of the information needed for customer care;
   wherein said relationship marketing server sends said information to said trusted agent server;
   wherein said customer opens said trusted agent, selects said smart receipt, and is presented with any of a number of services and pre-formatted and routed requests for related product offers.

7. The apparatus of claim 1, wherein said commerce server implements any of a point-based loyalty program, a club card for discounted purchases, and a volume purchase reward.

8. A trusted agent process for assisting a customer in managing their online commercial affairs, said process comprising the steps of:
   visiting any merchant network location that contains a customer completed form;
   invoking a trusted agent service using a specific network address that links said customer to a trusted agent service provider's server;
   providing customer identification and/or authorization information to said trusted agent service;
   submitting a customer request to said trusted agent server;
   said trusted agent service automatically completing said form for said customer; and
   sending said completed form to said merchant using a standard transport protocol.

9. The process of claim 8, wherein said trusted agent server performs certain actions on behalf of the customer using either of an indirect technique and a direct technique.

10. The process of claim 9, wherein said indirect technique communicates command operations from said trusted agent server first to said customer's location and then to said merchant.

11. The process of claim 10, further comprising the steps of:
    invoking said trusted agent service;
    completing said form as a result of customer and trusted agent server interaction; and
    submitting said completed form to said merchant from said customer location.

12. The process of claim 9, wherein said direct technique communicates operations directly from said trusted agent server to said merchant.

13. The process of claim 8, further comprising the step of:
    representing a business instrument as a network digital object that has ownership which can be verified over a network, wherein said digital object is stored at said trusted agent server.

14. The process of claim 13, wherein said business instrument comprises any of a credit card, warranty, receipt, or contract.

15. A process for creating a trusted agent on a customer system for assisting said customer in managing their online commercial affairs, said process comprising the steps of:
    running a browser with cryptography enabled on said system;
    applying for a code signing certificate by using said browser;
    generating a key in said browser and retrieving said certificate;
    installing an object signing tool on said system;
    storing files that are to be signed in a directory on said system;
    said signing tool signing each file separately and storing related signatures in a file;
    selecting the name of said file where said signatures are stored;
    assigning a unique ID attribute for each script used to implement said trusted agent;
    signing each said script;
    finding a certificate location;
    running said signing tool;
    said signing tool creating a trusted agent file; and
    storing said trusted agent file on a trusted agent server along with said scripts.

16. The process of claim 15, wherein said trusted agent is written in a portable language which, optionally, comprises any of JavaScript, Java, C, C++, Visual Basic, ECMAscript, and Dynamic HTML.

17. An apparatus for assisting a customer in managing their online commercial affairs, comprising:
    a network access device by which said customer contacts a trusted agent server that holds and manages said customer's business affairs, said network access device including a trusted agent client that augments said network access device to perform commercial transactions with third parties on behalf of said customer;
    wherein said trusted agent server is accessed at a unique network address provided by a uniform resource locator (URL);
    wherein said URL is identified with, and selected by, an actuation mechanism associated with said trusted agent client; and
    wherein said customer controls said commercial transactions with said third parties through said trusted agent server.

18. The apparatus of claim 17, wherein said actuation mechanism comprises any of a button, a hotkey, a user gesture, or voice command.

19. The apparatus of claim 17, wherein code elements of said trusted agent client require code signing.

20. An apparatus for assisting a customer in managing their online commercial affairs, comprising:
    a trusted agent server that holds and manages said customer's business affairs, said trusted agent server responsive to a network access device by which said customer contacts said trusted agent server to perform commercial transactions with third parties on behalf of said customer;

wherein said trusted agent server has a unique network address provided by a uniform resource locator (URL);

wherein said customer controls said commercial transactions with said third parties through said trusted agent server;

wherein said trusted agent server populates an electronic form with information required for said commercial transaction; and wherein said trusted agent continues to monitor the web page and fills in the subsequent web pages until the merchant's transaction is concluded.

21. A process for creating a trusted agent on a customer system for assisting said customer in managing their online commercial affairs, said process comprising the steps of:

running a browser with cryptography enabled on said system;

applying for a code signing certificate by using said browser;

generating a key in said browser and retrieving said certificate;

installing an object signing tool on said system;

storing files that are to be signed in a directory on said system;

said signing tool signing each file separately and storing related signatures in a file;

selecting the name of said file where said signatures are stored;

assigning a unique ID attribute for each script used to implement said trusted agent;

finding a certificate location;

running said signing tool;

said signing tool creating a trusted agent file; and storing said trusted agent file on a trusted agent server along with said scripts.

22. The process of claim 21, wherein said trusted agent is written in a portable language which, optionally, comprises any of JavaScript, Java, C, C++, Visual Basic, ECMAscript, and Dynamic HTML.

* * * * *